United States Patent
Subbunarayanan et al.

(10) Patent No.: US 11,200,155 B2
(45) Date of Patent: Dec. 14, 2021

(54) SYSTEM AND METHOD FOR AUTOMATED APPLICATION TESTING

(71) Applicant: The Toronto-Dominion Bank, Toronto (CA)

(72) Inventors: Periyakaruppan Subbunarayanan, Toronto (CA); Ramesh Raghunathan, Toronto (CA); Aayush Kathuria, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 16/844,147

(22) Filed: Apr. 9, 2020

(65) Prior Publication Data
US 2021/0318948 A1    Oct. 14, 2021

(51) Int. Cl.
*G06F 11/36*  (2006.01)

(52) U.S. Cl.
CPC ................................ *G06F 11/3688* (2013.01)

(58) Field of Classification Search
CPC .................................................. G06F 11/3688
See application file for complete search history.

(56) References Cited

U.S. PATENT DOCUMENTS

| | | | |
|---|---|---|---|
| 6,779,134 B1 * | 8/2004 | Laviolette | G06F 11/3006 714/38.12 |
| 7,152,027 B2 * | 12/2006 | Andrade | G06F 11/263 703/21 |
| 7,640,423 B2 * | 12/2009 | Troan | G06F 11/3688 713/1 |
| 7,735,080 B2 * | 6/2010 | Barturen | G06F 8/71 717/177 |
| 7,870,535 B2 * | 1/2011 | Rippert, Jr. | G06F 11/36 717/100 |
| 8,037,360 B2 * | 10/2011 | Rusmanov | G06F 11/3696 714/38.1 |
| 8,566,648 B2 | 10/2013 | Schroeder | |
| 8,620,305 B2 | 12/2013 | Singh et al. | |
| 8,621,434 B2 * | 12/2013 | Campion | G06F 9/5072 717/124 |

(Continued)

OTHER PUBLICATIONS

RobusTest2.0 Documentation Documentation—https://robustest-documentation.readthedocs.io/en/latest/introduction.html# Izinga Software Pvt Ltd Date of publication: Jan. 2020 https://readthedocs.org/projects/robustest-docs/downloads/pdf/latest/ Abstract: Excerpt: RobusTest is the app testing platform for all things mobile. Internally we like to call it the Swiss Knife for Mobile App Testing.

*Primary Examiner* — Douglas M Slachta
(74) *Attorney, Agent, or Firm* — CPST Intellectual Property Inc.; Brett J. Slaney

(57) ABSTRACT

A system and method are provided for automated application testing. The method is executed by a device having a communications module and includes requesting via the communications module, from a repository for a development environment, a current build file for each of at least one device type. The method also includes receiving via the communications module, from the repository, the current build file for each device type; deploying via the communications module, each current build file on a respective device type; and initiating at least one test on each device type based on a simulation of the device operating according to the current build file.

20 Claims, 8 Drawing Sheets

(56) References Cited

U.S. PATENT DOCUMENTS

| | | | |
|---|---|---|---|
| 8,893,093 B2 | 11/2014 | Hossain et al. | |
| 9,021,443 B1* | 4/2015 | Lachwani | G06F 11/3664 |
| | | | 717/127 |
| 9,274,935 B1 | 3/2016 | Lachwani et al. | |
| 9,277,432 B2 | 3/2016 | Mathur et al. | |
| 9,384,121 B2 | 7/2016 | Jackson et al. | |
| 9,491,248 B2 | 11/2016 | Broda et al. | |
| 9,495,282 B2 | 11/2016 | Varadharajan | |
| 9,720,569 B2 | 8/2017 | Gardner et al. | |
| 9,886,374 B1* | 2/2018 | Kuo | G06F 11/3692 |
| 9,942,105 B2 | 4/2018 | Gardner et al. | |
| 10,139,449 B2* | 11/2018 | Caradonna | G01R 31/31926 |
| 10,372,600 B2 | 8/2019 | Mathur | |
| 10,459,835 B1 | 10/2019 | George et al. | |
| 10,810,108 B2* | 10/2020 | Hotra | G06F 11/3652 |
| 10,846,210 B1* | 11/2020 | Singh | G06Q 20/4016 |
| 10,853,232 B2* | 12/2020 | Henry | G06F 11/3692 |
| 2004/0117413 A1* | 6/2004 | Brown | G06F 8/71 |
| 2005/0204201 A1* | 9/2005 | Meenakshisundaram | |
| | | | G06F 11/3688 |
| | | | 714/38.1 |
| 2009/0307763 A1* | 12/2009 | Rawlins | G06F 11/3672 |
| | | | 726/5 |
| 2013/0132933 A1* | 5/2013 | Rajaram | G06F 11/3664 |
| | | | 717/126 |
| 2014/0380278 A1* | 12/2014 | Dayan | G06F 11/3692 |
| | | | 717/124 |
| 2015/0095884 A1* | 4/2015 | Marum | G06F 11/3688 |
| | | | 717/110 |
| 2015/0106791 A1* | 4/2015 | Karuppiah | G06F 11/3688 |
| | | | 717/127 |
| 2016/0085666 A1* | 3/2016 | Jordan | H04L 67/42 |
| | | | 714/38.1 |
| 2016/0132314 A1* | 5/2016 | Solsona-Palomar | |
| | | | G06F 9/44505 |
| | | | 717/172 |
| 2016/0147645 A1* | 5/2016 | Kandpal | G06F 11/3688 |
| | | | 717/124 |
| 2016/0259719 A1* | 9/2016 | Gouvernel | G06F 9/455 |
| 2016/0283355 A1* | 9/2016 | Shani | G06F 11/3684 |
| 2017/0147476 A1* | 5/2017 | Ji | G06F 8/41 |
| 2018/0084047 A1* | 3/2018 | Hao | G06F 11/3688 |
| 2018/0089068 A1* | 3/2018 | Bhojan | G06F 8/61 |
| 2018/0203792 A1* | 7/2018 | Ekambaram | G06F 11/3688 |
| 2018/0253296 A1 | 9/2018 | Brebner et al. | |
| 2018/0349257 A1* | 12/2018 | Bhattacharjee | G06F 8/71 |
| 2019/0294528 A1* | 9/2019 | Avisror | G06F 8/60 |
| 2020/0019493 A1* | 1/2020 | Ramakrishna | G06F 8/65 |

* cited by examiner

SYSTEM AND METHOD FOR AUTOMATED APPLICATION TESTING

TECHNICAL FIELD

The following relates generally to automated application testing.

BACKGROUND

As the number of mobile users increases, so too does the importance of measuring performance metrics on mobile devices. For example, it is found that users expect applications (also referred to herein as "apps") to load within a short amount of time, e.g., about two seconds. Because of this, some feel that native app load times should be as fast as possible. Additionally, poor app performance can impact an organization in other ways, for example, by increasing the number of technical service requests or calls, as well as negatively impacting ratings or rankings in application marketplaces (e.g., app stores), or more generally reviews or reputation. These negative impacts can also impact customer retention and uptake, particularly for younger generations who value their ability to perform many tasks remotely and with mobility.

Mobile performance testing typically measures key performance indicators (KPIs) from three perspectives, namely the end-user perspective, the network perspective, and the server perspective. The end-user perspective looks at installation, launch, transition, navigation, and uninstallation processes. The network perspective looks at network performance on different network types. The server perspective looks at transaction response times, throughput, bandwidth and latency. This type of testing is performed in order to identify root causes of application performance bottlenecks to fix performance issues, lower the risk of deploying systems that do not meet business requirements, reduce hardware and software costs by improving overall system performance, and support individual, project-based testing and centers of excellence.

In addition to the above technical challenges, user experience can more generally vary across devices, operating system (OS) type, and networks. This means that performance metrics should be tested, and development continually updated, across all of the devices that support an app.

A potential issue with addressing the above challenges is that development and testing environments tend to be segregated or even disjointed. Because of this, the testing process can introduce a lag in the development process or at least cause issues to be resolved with more latency than is desired.

BRIEF DESCRIPTION OF THE DRAWINGS

Embodiments will now be described with reference to the appended drawings wherein.

DETAILED DESCRIPTION

Figure 1:
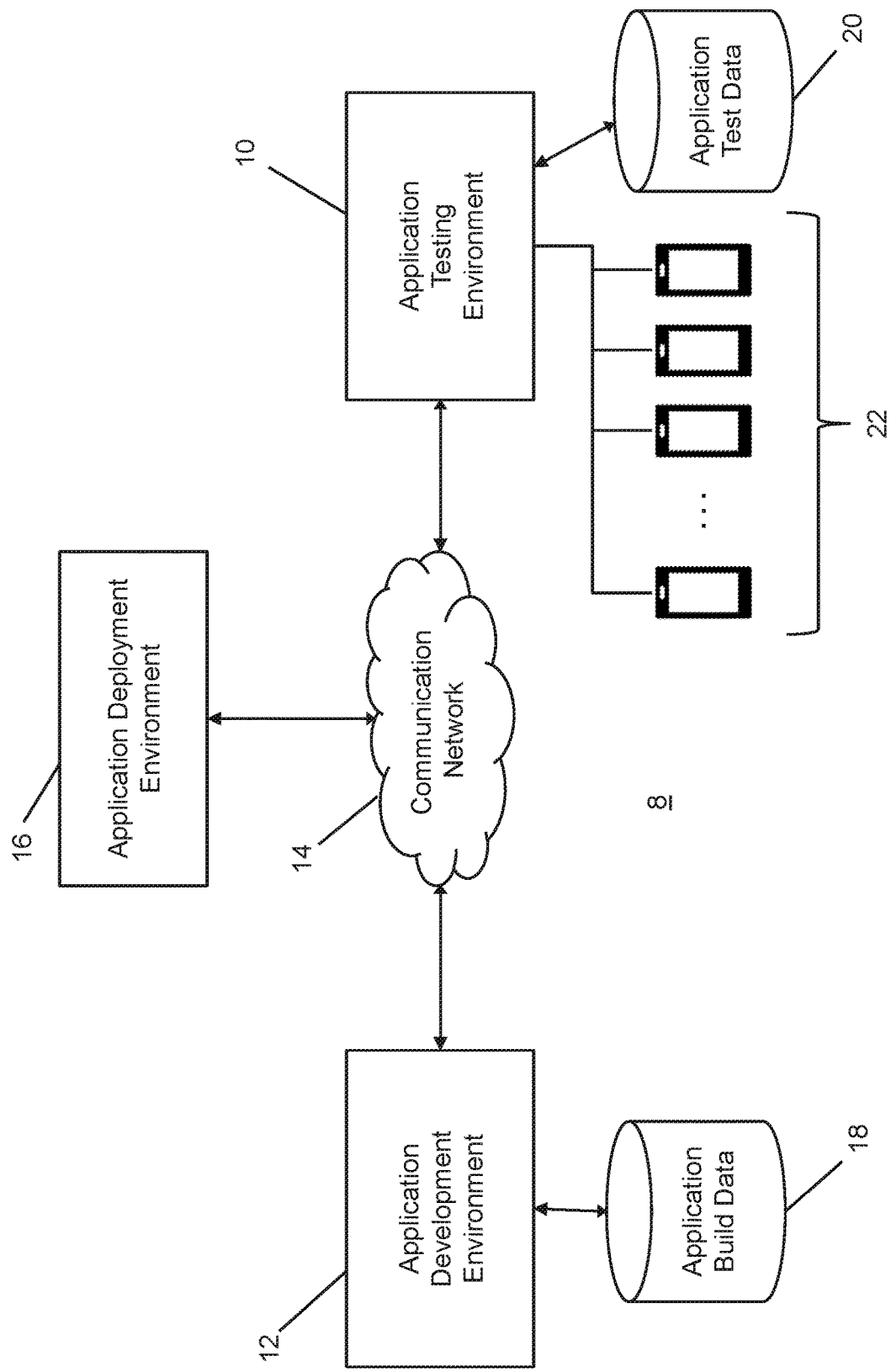
FIG. 1 is a schematic diagram of an example computing environment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

The following generally relates to an application testing framework or application testing environment, which is integrated with an application development environment to enable automated periodic or continuous build performance testing under varied network and device conditions, and to provide a faster feedback loop for developers over all devices that use the application, particularly different types of mobile devices. That is, an application testing environment is provided as described herein, to automate the testing of app builds across different devices and device types (e.g., Android and iOS) on a frequent basis, e.g., daily.

As used herein a "build" may refer to the process of creating an application program for a software release, by taking all the relevant source code files and compiling them and then creating build artifacts, such as binaries or executable program(s), etc. "Build data" may therefore refer to any files or other data associated with a build. The terms "build" and "build data" (or "build file") may also be used interchangeably to commonly refer to a version or other manifestation of an application, or otherwise the code or program associated with an application that can be tested for performance related metrics.

The application testing environment may be capable of downloading and installing build files on to devices, running user interface (UI) performance tests in parallel across multiple devices, and capturing application traffic logs. To improve the integration of the testing and development environments, the application testing environment is configured to execute an automated build download, retrieval, and installation process, as described below. An objective is to automate the testing of frequent app builds (e.g., nightly) by configuring the application testing environment to download the latest builds and install these builds onto the devices that support the app.

For example, the application testing environment can download the latest app builds (for multiple OS types) from the respective developer repositories or a central development repository. Then, the builds can be installed on the respective devices. Upon installation, the application on each device can be configured to point to the appropriate environment under test and other settings can be selected/deselected for one or more different test types.

It is found that using current testing solutions, downloading the latest builds for multiple platforms and installing them onto devices is a manual effort. Such manual efforts can be time-consuming as they would require manual effort to be replicated across each device. The automated process implemented by the application testing environment described herein can mitigate this manual effort.

The application testing environment can be implemented as a scalable solution, which automates the activities required to download and install the respective latest builds onto all types of applicable devices. With an increasing number of devices and device types, the solution provided by the application testing environment provides a convenient way to perform the task of downloading the latest builds from the respective repositories for all relevant platforms and running a UI flow on all devices to configure the environment, disable system pop-ups, and set feature flags. Thus, the application testing environment can automate the build download and installation process.

It will be appreciated that while examples provided herein may be primarily directed to automated testing of mobile applications, the principles discussed herein apply equally to applications deployed on or otherwise used by other devices, such as desktop or laptop computers, e.g., to be run on a web browser or locally installed instance of an application.

Certain example systems and methods described herein are able to automate application testing. In one aspect, there is provided a device for automated application testing. The device includes a processor, a communications module coupled to the processor, and a memory coupled to the processor. The memory stores computer executable instructions that when executed by the processor cause the processor to request via the communications module, from a repository for a development environment, a current build file for each of at least one device type. The computer executable instructions, when executed, also cause the processor to receive via the communications module, from the repository, the current build file for each device type; deploy via the communications module, each current build file on a respective device type; and initiate at least one test on each device type based on a simulation of the device operating according to the current build file.

In another aspect, there is provided a method of automated application testing. The method is executed by a device having a communications module. The method includes requesting via the communications module, from a repository for a development environment, a current build file for each of at least one device type. The method also includes receiving via the communications module, from the repository, the current build file for each device type; deploying via the communications module, each current build file on a respective device type; and initiating at least one test on each device type based on a simulation of the device operating according to the current build file.

In another aspect, there is provided non-transitory computer readable medium for automated application testing. The computer readable medium includes computer executable instructions for requesting via a communications module, from a repository for a development environment, a current build file for each of at least one device type. The computer readable medium also includes instructions for receiving via the communications module, from the repository, the current build file for each device type; deploying via the communications module, each current build file on a respective device type; and initiating at least one test on each device type based on a simulation of the device operating according to the current build file.

In certain example embodiments, a plurality of current build files is requested and received, for a plurality of respective device types.

In certain example embodiments, the device can further cause the processor to determine a testing time; initiate the request at the testing time; obtain test results for the at least one test; and send data associated with the at least one test to the development environment. The data associated with the at least one test can be sent to the development environment prior to a next request for a current build to enable the data to be used in a development iteration.

In certain example embodiments, deploying the current build file can include configuring the respective device to point to a predetermined environment under test, and automatically selecting or deselecting at least one setting in an installation process.

In certain example embodiments, the request can be initiated on a periodic basis. The at least one test can also include a loading operation to determine a load time for an application on the device.

In certain example embodiments, the device can further cause the processor to determine a new device type; incorporate the new device type into a testing environment; and have a subsequent request obtain a current build file for the new device type.

In certain example embodiments, the at least one test can include one or more of an end-user performance test, a network performance test, or a server performance test. The at least one test can also be executed for a plurality of environments, the plurality of environments including one or more of a device environment, a network environment, or a server environment.

In certain example embodiments, where multiple build files are requested and received, the device can further cause the processor to run parallel tests or iterations of a test on multiple devices, multiple device types, or multiple environments. The device can also further cause the processor to log testing data for a plurality of tests and compare the plurality tests for at least one performance metric using logged data.

In certain example embodiments, a plurality of tests can be performed to obtain data under different conditions.

FIG. 1 illustrates an exemplary computing environment 8. In this example, the computing environment 8 may include an application testing environment 10, an application development environment 12, and a communications network 14 connecting one or more components of the computing environment 8. The computing environment 8 may also include or otherwise be connected to an application deployment environment 16, which provides a platform, service, or other entity responsible for posting or providing access to applications that are ready for use by client devices. The application development environment 12 includes or is otherwise coupled to one or more repositories or other data storage elements for storing application build data 18. The application build data 18 can include any computer code and related data and information for an application to be deployed, e.g., for testing, execution or other uses.

In this example, the application build data 18 can be provided via one or more repositories and include the data and code required to perform application testing on a device or simulator. It can be appreciated that while FIG. 1 illustrates a number of test devices 22 that resemble a mobile communication device, such testing devices 22 can also include simulators, simulation devices or simulation processes, all of which may be collectively referred to herein as "test devices 22" for ease of illustration. The application testing environment 10 may include or otherwise have access to one or more repositories or other data storage elements for storing application test data 20, which includes any files, reports, information, results, metadata or other data associated with and/or generated during a test implemented within the application testing environment 10.

The computing environment 8 may be part of an enterprise or other organization that both develops and tests applications. In such cases, the communication network 14 may not be required to provide connectivity between the application development environment 12 and the application testing environment 10, wherein such connectivity is provided by an internal network. The application development environment 12 and application testing environment 10 may also be integrated into the same enterprise environment as subsets thereof. That is, the configuration shown in FIG. 1 is illustrative only. Moreover, the computing environment 8 can include multiple enterprises or organizations, e.g., wherein separate organizations are configured to, and responsible for, application testing and application development. For example, an organization may contract a third-party to develop an app for their organization but perform testing internally to meet proprietary or regulatory requirements. Similarly, an organization that develops an app may outsource the testing stages, particularly when testing is performed infrequently. The application deployment environment 16 may likewise be implemented in several different ways. For example, the deployment environment 16 may include an internal deployment channel for employee devices, may include a public marketplace such as an app store, or may include any other channel that can make the app available to clients, consumers or other users.

One example of the computing environment 8 may include a financial institution system (e.g., a commercial bank) that provides financial services accounts to users and processes financial transactions associated with those financial service accounts. Such a financial institution system may provide to its customers various browser-based and mobile applications, e.g., for mobile banking, mobile investing, mortgage management, etc.

Test devices 22 can be, or be simulators for, client communication devices that would normally be associated with one or more users. Users may be referred to herein as customers, clients, correspondents, or other entities that interact with the enterprise or organization associated with the computing environment 8 via one or more apps. Such client communication devices are not shown in FIG. 1 since such devices would typically be used outside of the computing environment 8 in which the development and testing occurs. However, it may be noted that such client communication devices may be connectable to the application deployment environment 16, e.g., to download newly developed apps, to update existing apps, etc. In certain embodiments, a user may operate the client communication devices such that client device performs one or more processes consistent with what is being tested in the disclosed embodiments. For example, the user may use client device to engage and interface with a mobile or web-based banking application which has been developed and tested within the computing environment 8 as herein described. In certain aspects, test devices 22 and client device can include, but are not limited to, a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication networks such as the communication network 14 shown by way of example in FIG. 1.

Communication network 14 may include a telephone network, cellular, and/or data communication network to connect different types of client devices. For example, the communication network 14 may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet).

Referring back to FIG. 1, the computing environment 8 may also include a cryptographic server (not shown) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public and private keys in a PKI), and perform other cryptographic operations that are required or desired for particular applications of the application development environment 12 and/or application testing environment 10. The cryptographic server may be used to protect data within the computing environment 8 (include the application build data 18 and/or application test data 20) by way of encryption for data protection, digital signatures or message digests for data integrity, and by using digital certificates to authenticate the identity of the users and entity devices with which the application development environment 12 and application testing environment 10 communicate to inhibit data breaches by adversaries. It can be appreciated that various cryptographic mechanisms and protocols can be chosen and implemented to suit the constraints and requirements of the particular deployment of the application development environment 12 and application testing environment 10 as is known in the art.

Figure 2:
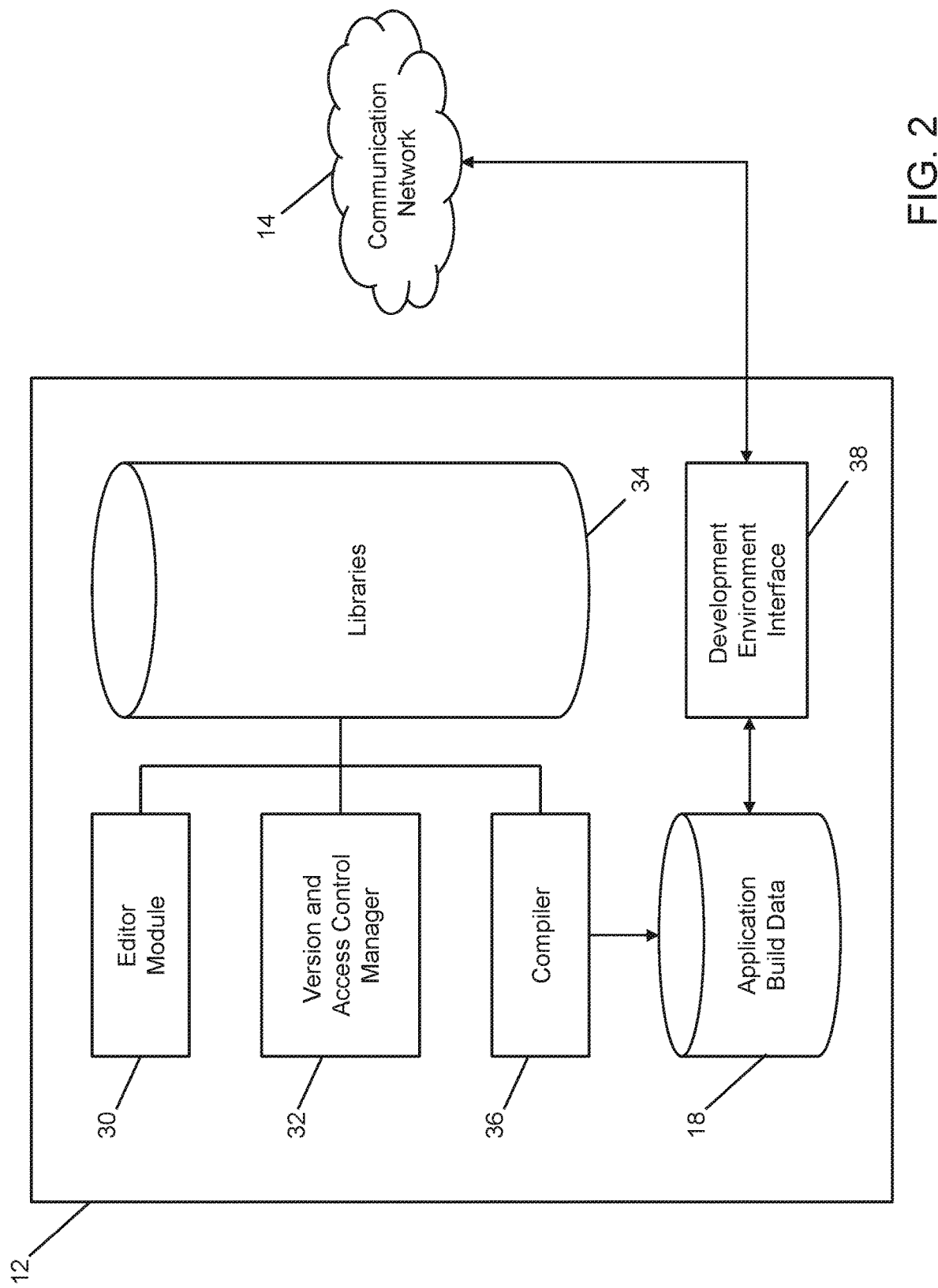
FIG. 2 is a block diagram of an example configuration of an application development environment.

In FIG. 2, an example configuration of the application development environment 12 is shown. It can be appreciated that the configuration shown in FIG. 2 has been simplified for ease of illustration. In certain example embodiments, the application development environment 12 may include an editor module 30, a version and access control manager 32, one or more libraries 34, and a compiler 36, which would be typical components utilized in application development. In this example, the application development environment 12 also includes the application build data 18, which, while shown within the environment 12, may also be a separate entity (e.g., repository) used to store and provide access to the stored build files. The application development environment 12 also includes or is provided with (e.g., via an application programming interface (API)) a development environment interface 38. The development environment interface 38 provides communication and data transfer capabilities between the application development environment 12 and the application testing environment 10 from the perspective of the application development environment 12. As shown in FIG. 2, the development environment interface 38 can connect to the communication network 14 to send/receive data and communications to/from the application testing environment 10 as discussed further below.

The editor module 30 can be used by a developer/programmer to create and edit program code associated with an application being developed. This can include interacting with the version and access control manager 32 to control access to current build files and libraries 34 while honoring permissions and version controls. The compiler 36 may then be used to compile an application build file and other data to be stored with the application build data 18. It can be appreciated that a typical application or software development environment 12 may include other functionality, modules, and systems, details of which are omitted for brevity and ease of illustration. It can also be appreciated that the application development environment 12 may include modules, accounts, and access controls for enabling multiple developers to participate in developing an application, and modules for enabling an application to be developed for multiple platforms. For example, a mobile application may be developed by multiple teams, each team potentially having multiple programmers. Also, each team may be responsible for developing the application on a different platform, such as Apple iOS or Google Android for mobile versions, and Google Chrome or Microsoft Edge for web browser versions. Similarly, applications may be developed for deployment on different device types, even with the same underlying operating system.

By having build files stored for all of the various operating systems, device types, and versions that are currently compatible and being used, and providing access via the development environment interface 38, the application testing environment 10 can automatically obtain and deploy the latest builds to perform application testing in different scenarios. Such scenarios can include not only different device types, operating systems, and versions, but also the same build under different operating conditions.

While not shown in FIG. 2 for clarity of illustration, in example embodiments, the application development environment 12 may be implemented using one or more computing devices such as terminals, servers, and/or databases, having one or more processors, communications modules, and database interfaces. Such communications modules may include the development environment interface 38, which enables the application development environment 12 to communicate with one or more other components of the computing environment 8, such as the application testing environment 10, via a bus or other communication network, such as the communication network 14. While not delineated in FIG. 2, the application development environment 12 (and any of its devices, servers, databases, etc.) includes at least one memory or memory device that can include a tangible and non-transitory computer-readable medium having stored therein computer programs, sets of instructions, code, or data to be executed by the one or more processors. FIG. 2 illustrates examples of modules, tools and engines stored in memory within the application development environment 12. It can be appreciated that any of the modules, tools, and engines shown in FIG. 2 may also be hosted externally and be available to the application development environment 12, e.g., via communications modules such as the development environment interface 38.

Figure 3:
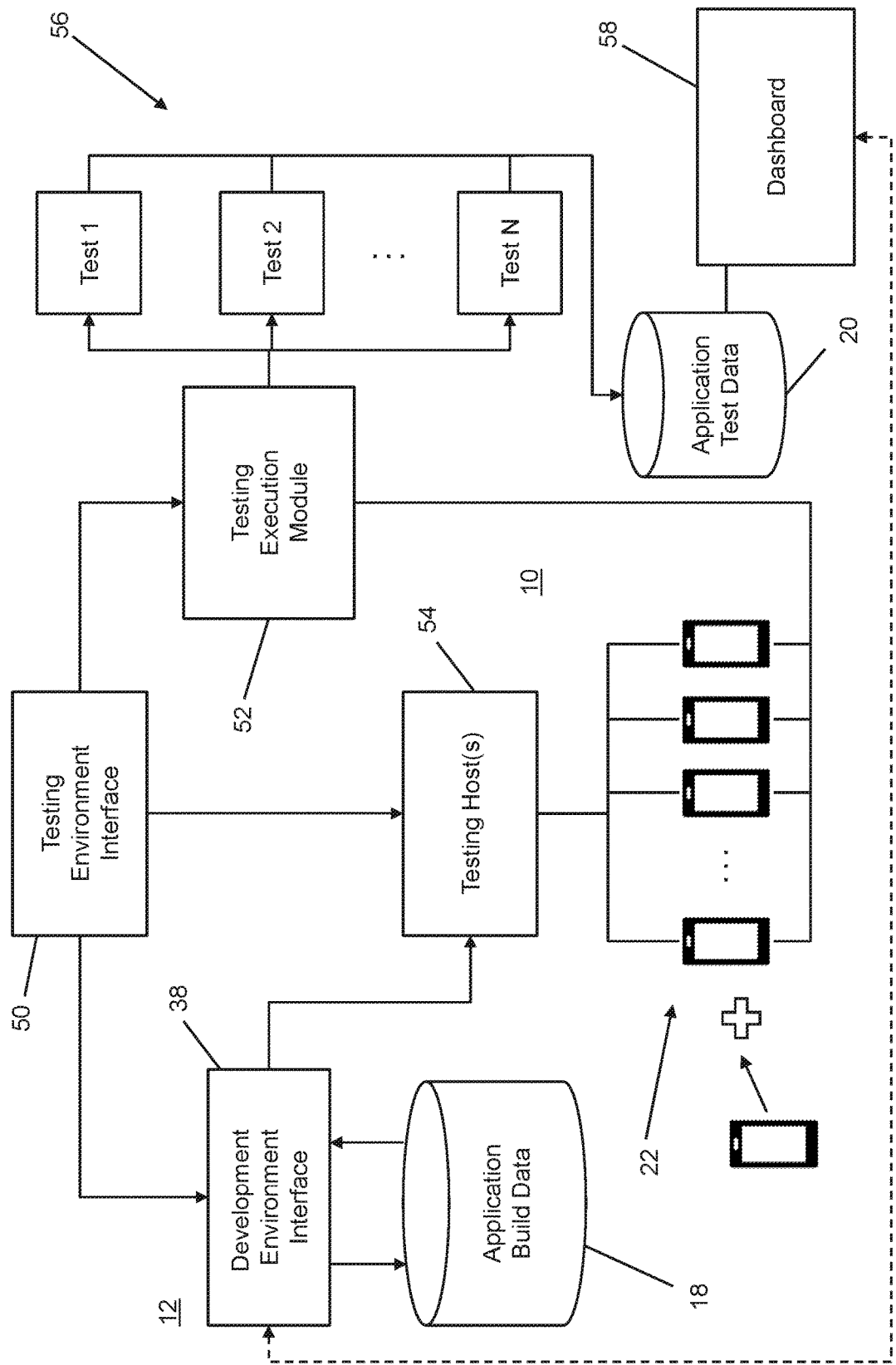
FIG. 3 is a block diagram of an example configuration of an application testing environment.

Turning now to FIG. 3, an example configuration of the application testing environment 10 is shown. The application testing environment 10 includes a testing environment interface 50, which is coupled to the development environment interface 38 in the application development environment 12, a testing execution module 52, and one or more testing hosts 54. The testing environment interface 50 can provide a UI for personnel or administrators in the application testing environment 10 to coordinate an automated build management process as herein described and to initiate or manage a test execution process as herein described.

The testing environment interface 50 can instruct the development environment interface 38, e.g., by sending a message or command via the communication network 14, to access the application build data 18 to obtain the latest application build(s) based on the number and types of devices being tested by the testing host(s) 54. The latest application builds are then returned to the application testing environment 10 by the development environment interface 38 to execute an automated build retrieval operation. As shown in FIG. 3, the application build data 18 can be sent directly to the testing host(s) 54 and thus the testing host(s) 54 can also be coupled to the communication network 14. It can be appreciated that the application build data 18 can also be provided to the testing host(s) 54 via the testing environment interface 50. The host(s) 54 in this example have access to a number of test devices 22 which, as discussed above, can be actual devices or simulators for certain devices. The testing host(s) 54 are also scalable, allowing for additional test devices 22 to be incorporated into the application testing environment 10. For example, a new test device 22 may be added when a new device type is released and will be capable of using the application being tested. Upon installation, the application on each test device 22 can be configured to point to the appropriate environment under test and other settings can be selected/deselected.

The test devices 22 are also coupled to the testing execution module 52 to allow the testing execution module 52 to coordinate tests 56 to evaluate metrics, for example, by executing tests for application traffic monitoring, determining UI response times, examining device logs, and determining resource utilization metrics (with Test 1, Test 2, . . . , Test N; shown in FIG. 3 for illustrative purposes). The tests 56 can generate data logs, reports and other outputs, stored as application test data 20, which can be made available to various entities or components, such as a dashboard 58. The framework shown in FIG. 3 enables the application testing environment 10 to download the latest builds from the respective repositories for the respective device/OS platform(s) and run a UI flow on all test devices 22 to configure the environment, disable system pop-ups, and set feature flags. In this way, the framework can automate the build download and installation process.

It can be appreciated that while the testing environment interface 50, the testing host(s) 54, and the testing execution module 52 are shown as separate modules in FIG. 3, such modules may be combined in other configurations and thus the delineations shown in FIG. 3 are for illustrative purposes.

Figure 4:
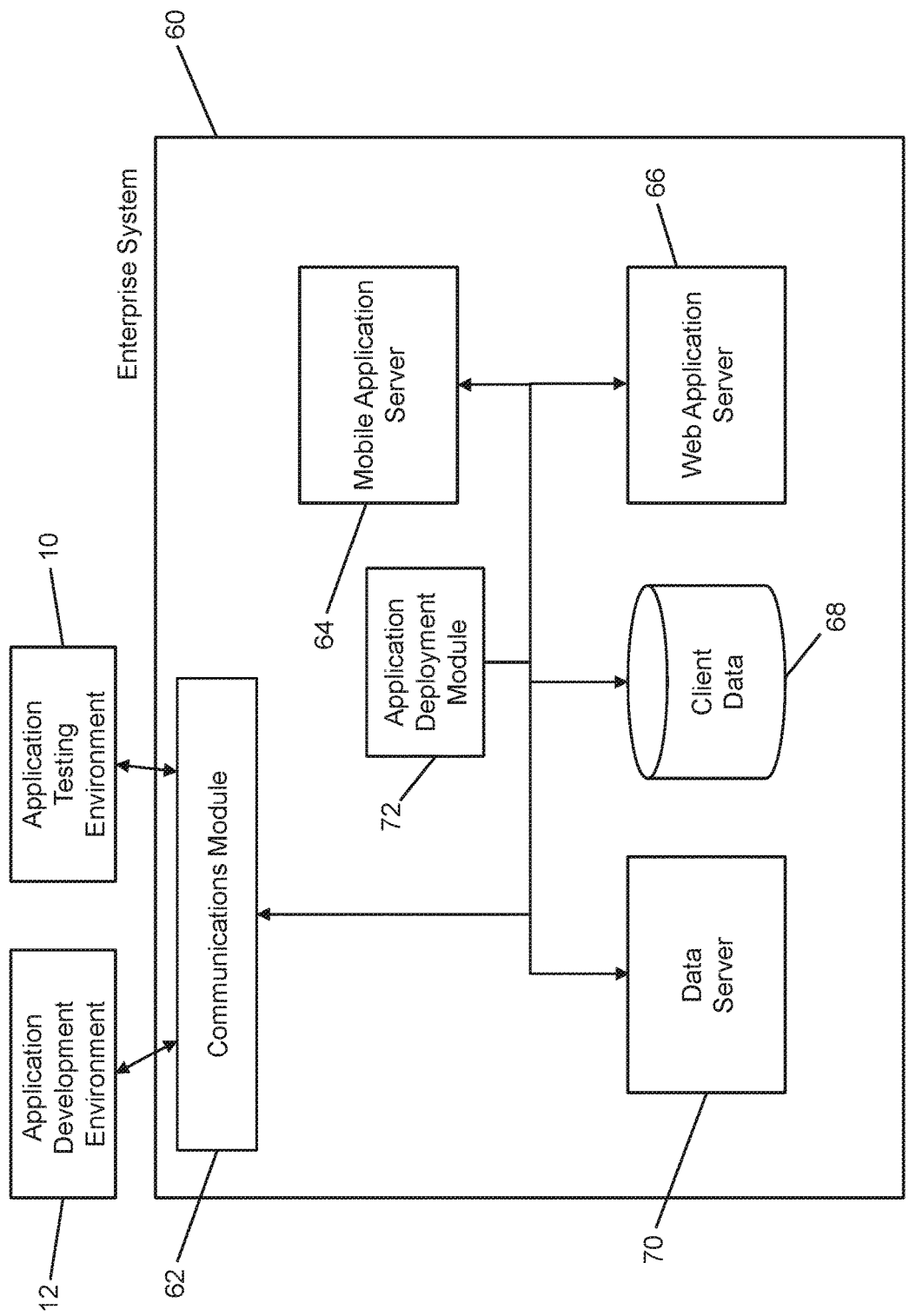
FIG. 4 is a block diagram of an example configuration of an enterprise system.

In FIG. 4, an example configuration of an enterprise system 60 is shown. The enterprise system 60 includes a communications module 62 that enables the enterprise system 60 to communicate with one or more other components of the computing environment 8, such as the application testing environment 10 or application development environment 12, via a bus or other communication network, such as the communication network 14. While not delineated in FIG. 4, the enterprise system 60 includes at least one memory or memory device that can include a tangible and non-transitory computer-readable medium having stored therein computer programs, sets of instructions, code, or data to be executed by one or more processors (not shown for clarity of illustration). FIG. 4 illustrates examples of servers and datastores/databases operable within the enterprise system 60. It can be appreciated that any of the components shown in FIG. 4 may also be hosted externally and be available to the enterprise system 60, e.g., via the communications module 62. In the example embodiment shown in FIG. 4, the enterprise system 16 includes one or more servers to provide access to client data 68, e.g., for development or testing purposes. Exemplary servers include a mobile application server 64, a web application server 66 and a data server 70. Although not shown in FIG. 4, as noted above, the enterprise system 60 may also include a cryptographic server for performing cryptographic operations and providing cryptographic services. The cryptographic server can also be configured to communicate and operate with a cryptographic infrastructure. The enterprise system 60 may also include one or more data storage elements for storing and providing data for use in such services, such as data storage for storing client data 68.

Mobile application server 64 supports interactions with a mobile application installed on client device (which may be similar or the same as a test device 22). Mobile application server 64 can access other resources of the enterprise system 60 to carry out requests made by, and to provide content and data to, a mobile application on client device. In certain example embodiments, mobile application server 64 supports a mobile banking application to provide payments from one or more accounts of user, among other things.

Web application server 66 supports interactions using a website accessed by a web browser application running on the client device. It can be appreciated that the mobile application server 64 and the web application server 66 can provide different front ends for the same application, that is, the mobile (app) and web (browser) versions of the same application. For example, the enterprise system 60 may provide a banking application that be accessed via a smartphone or tablet app while also being accessible via a browser on any browser-enabled device.

The client data 68 can include, in an example embodiment, financial data that is associated with users of the client devices (e.g., customers of the financial institution). The financial data may include any data related to or derived from financial values or metrics associated with customers of a financial institution system (i.e. the enterprise system 60 in this example), for example, account balances, transaction histories, line of credit available, credit scores, mortgage balances, affordability metrics, investment account balances, investment values and types, among many others. Other metrics can be associated with the financial data, such as financial health data that is indicative of the financial health of the users of the client devices.

An application deployment module 72 is also shown in the example configuration of FIG. 4 to illustrate that the enterprise system 60 can provide its own mechanism to deploy the developed and tested applications onto client devices within the enterprise. It can be appreciated that the application deployment module 72 can be utilized in conjunction with a third-party deployment environment 16 such as an app store to have tested applications deployed to employees and customers/clients.

Figure 5:
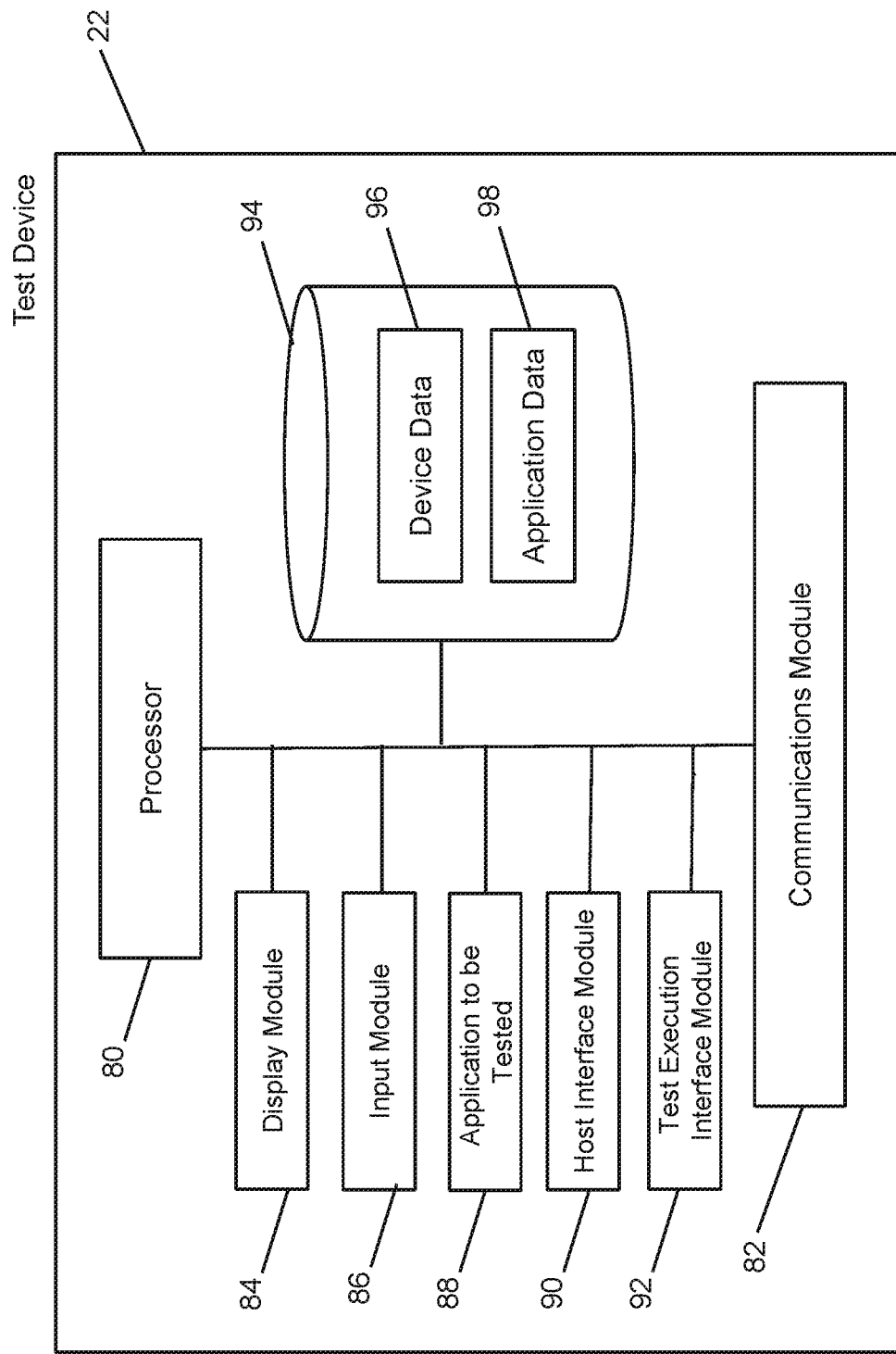
FIG. 5 is a block diagram of an example configuration of a test device used to test an application build in the application testing environment.

In FIG. 5, an example configuration of a test device 22 is shown. It can be appreciated that the test device 22 shown in FIG. 5 can correspond to an actual device or represent a simulation of such a device 22. In certain embodiments, the client device 22 may include one or more processors 80, a communications module 82, and a data store 94 storing device data 96 and application data 98. Communications module 82 enables the test device 22 to communicate with one or more other components of the computing environment 8 via a bus or other communication network, such as the communication network 14. While not delineated in FIG. 5, the client device 22 includes at least one memory or memory device that can include a tangible and non-transitory computer-readable medium having stored therein computer programs, sets of instructions, code, or data to be executed by processor 80. FIG. 5 illustrates examples of modules and applications stored in memory on the test device 22 and operated by the processor 80. It can be appreciated that any of the modules and applications shown in FIG. 5 may also be hosted externally and be available to the test device 22, e.g., via the communications module 82.

In the example embodiment shown in FIG. 5, the test device 22 includes a display module 84 for rendering GUIs and other visual outputs on a display device such as a display screen, and an input module 86 for processing user or other inputs received at the test device 22, e.g., via a touchscreen, input button, transceiver, microphone, keyboard, etc. The test device 22 may also include an application 88 to be tested that includes the latest application build data 18 to be tested using the test device 22, e.g., by executing tests 56. The test device 22 may include a host interface module 90 to enable the test device 22 to interface with a testing host 54 for loading an application build. The test device 22 in this example embodiment also includes a test execution interface module 92 for interfacing the application 88 with the testing execution module 52. The data store 94 may be used to store device data 96, such as, but not limited to, an IP address or a MAC address that uniquely identifies test device 22. The data store 94 may also be used to store application data 98, such as, but not limited to, login credentials, user preferences, cryptographic data (e.g., cryptographic keys), etc.

It will be appreciated that only certain modules, applications, tools and engines are shown in FIGS. 2 to 5 for ease of illustration and various other components would be provided and utilized by the application testing environment 10, application development environment 12, and test device 22, as is known in the art.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of any of the servers or other devices in the application testing environment 10, application development environment 12, enterprise system 60 or test device 22, or accessible or connectable thereto. Any application or module herein described may be implemented using computer readable/ executable instructions that may be stored or otherwise held by such computer readable media.

Figure 6:
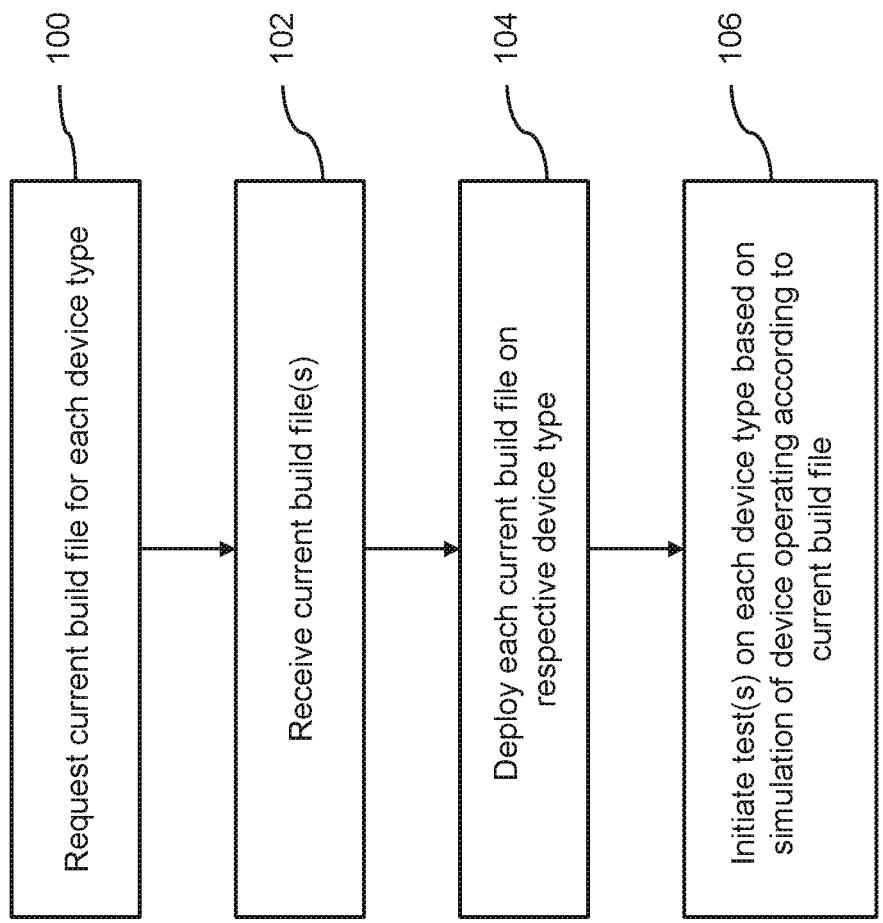
FIG. 6 is a flow diagram of an example of computer executable instructions for automated application testing.

Referring to FIG. 6, an example embodiment of computer executable instructions for automated application testing is shown. At block 100, a request for the current application build file for each device type to be tested is made, e.g., by the testing environment interface 50 sending the request to the development environment interface 38 via the communication network 14. At block 102, the current build file(s) is/are received from the repository storing the application build data 18. For example, the development environment interface 38 may access the build files from the application build data 18 and send the build files to the testing environment interface 50 via the communication network 14. The application testing environment 10 then deploys each current build file on to the respective device type (or simulator type) at block 104. This can be performed by having the testing host(s) 54 install the application build, point to the desired test environment and select/deselect appropriate settings. At block 106, the application testing environment 10 initiates one or more tests on each device type based on the simulation of that device operating according to the current build file that has been deployed. This can include initiating tests 56 by the testing execution module 52 and generating outputs for the testing logs and dashboard 58.

Figure 7:
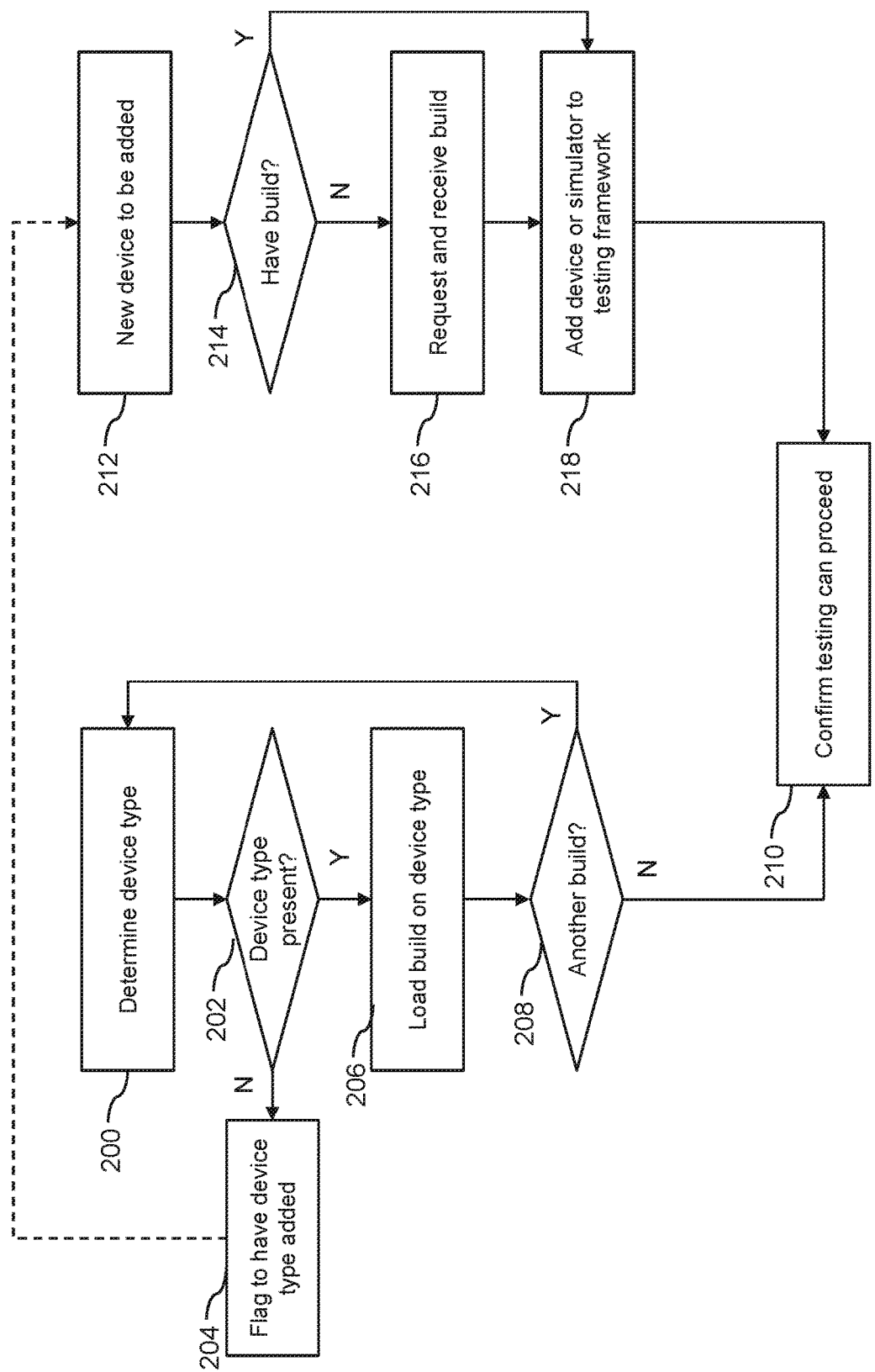
FIG. 7 is a flow diagram of an example of computer executable instructions for deploying multiple application builds on multiple devices, and for adding new devices to be tested.

Referring to FIG. 7, an example embodiment of computer executable instructions for deploying multiple application builds on multiple devices, and for adding new devices to be testing, is shown. At block 200, a device type is determined for an application build file that has been received, e.g., by a testing host 54. The testing host 54 determines at block 202 if the corresponding device type is present. If not, the testing host 54 can generate a flag or other notification for the testing environment interface 50 to have a new test device 22 added. If the device type is present, the build file is loaded on that test device 22 at block 206. The testing host 54 may then determine if there is another build file to be installed at block 208. If so, the process may repeat at block 200. If not, the testing host 54 can confirm to the testing execution module 52 that the testing can proceed.

As indicated above, a new device may be added. For example, as shown in dashed lines in FIG. 7, when a build file exists for the application being tested and a test device 22 or simulator is not available, the application testing environment 10 may initiate a process to add a new device. Similarly, a new device or device type (e.g., new release) may cause the application testing environment 10 to provision for the new device. At block 212 the application testing environment 10 determines that a new device is to be added. At block 214 the testing host 54 determines if it has a build file for that new device. If not, the testing host 54 can have the testing environment interface 50 communicate with the development environment interface 38 to request and receive the associated build at block 216. If the build does exist, or has been obtained at block 216, the new device (or a simulator for that device) is added as a new test device at block 218. The testing host 54 may then confirm at block 210 that testing can proceed. It can be appreciated that testing can be initiated on existing devices while new devices are being provisioned, or the process can wait until the new device(s) is/are added. It can also be appreciated that the process for adding a new device (i.e. blocks 212-218) can be performed "offline", that is, separately from the installation and testing process of blocks 200-210. For example, new devices can be added according to a separate schedule from the automated installation and build testing herein described such that when the new builds are requested, the request can include any and all current devices provisioned with the testing host(s) 54.

Figure 8:
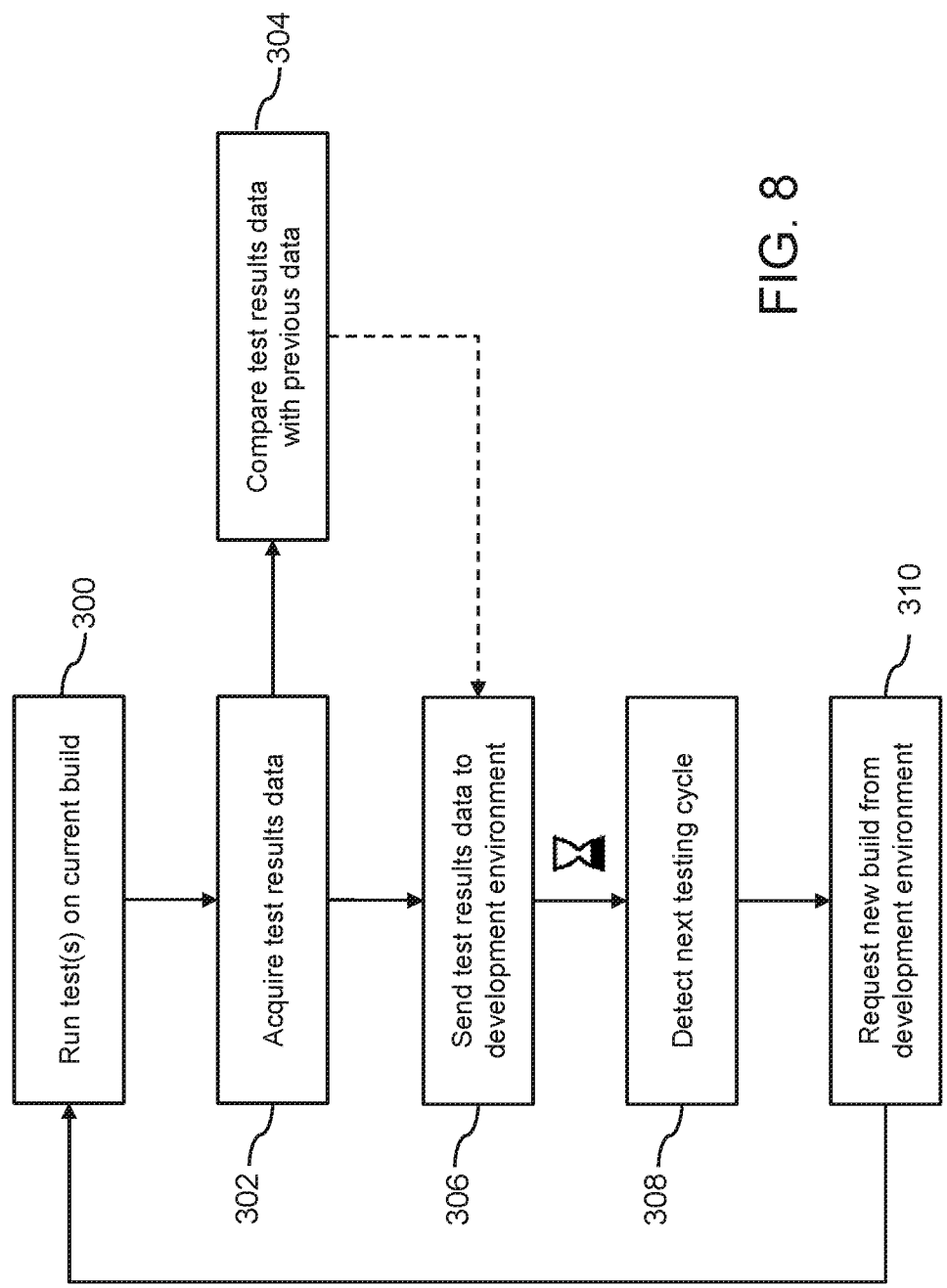
FIG. 8 is a flow diagram of an example of computer executable instructions for initiating periodic testing based on acquiring a latest build for an application.

Referring now to FIG. 8, an example embodiment of computer executable instructions for initiating periodic testing based on acquiring a latest build for an application, is shown. At block 300, one or more tests are run for a current build, e.g., as shown in FIGS. 6 and 7. At block 302, test results data are acquired. It can be appreciated that the current test results data acquired at block 302 can be compared with previous test results data at block 304, e.g., to determine whether feedback provided to the application development environment 12 in a previous iteration has led to an improvement in the application. As shown in FIG. 8, this comparison can be used to provide additional feedback with the test results data send to the application development environment 12 at block 306. After a period of time, e.g., one day, one week, etc.; the application testing environment 10 detects the next testing cycle at block 308 and requests a new build from the application development environment 12 at block 310. It can be appreciated that blocks 306, 308 and 310 can be coordinated and/or executed by the testing environment interface 50.

The process can be repeated by returning to block 300 wherein new testing is performed using the latest build files that have been acquired, installed, and provisioned on the test devices 22.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A device for automated application testing, the device comprising:
    a processor;
    a communications module coupled to the processor; and
    a memory coupled to the processor, the memory storing computer executable instructions that when executed by the processor cause the processor to:
        integrate an application testing environment with an application development environment by directly connecting a testing environment interface coupled to a testing execution module to a development environment interface coupled to a repository used by the application development environment to store build files generated in the application development environment, for each of at least one device type;
        determine that a new device type is to be added to the application testing environment;
        automatically add the new device type to an application testing framework in the application testing environment;
        automatically request by the testing environment via the direct connection from the repository, a current build file for each of the at least one device type, including a new or current build file for the new device type;

automatically receive via the direct connection, from the repository, the current or a new build file for each device type;

deploy each new or current build file on a respective device type;

initiate at least one test on each device type based on a simulation of the device operating according to the new or current build file and obtain test result data; and automatically feedback the test result data via the direct connection to the application development environment.

2. The device of claim 1, wherein a plurality of current build files are requested and received, for a plurality of respective device types.

3. The device of claim 1, wherein the computer executable instructions further cause the processor to:
determine a testing time;
initiate the request at the testing time;
obtain test results for the at least one test; and
send data associated with the at least one test to the development environment.

4. The device of claim 3, wherein the data associated with the at least one test is sent to the development environment prior to a next request for a current build to enable the data to be used in a development iteration.

5. The device of claim 1, wherein deploying the current build file comprises configuring the respective device to point to a predetermined environment under test, and automatically selecting or deselecting at least one setting in an installation process.

6. The device of claim 1, wherein the request is initiated on a periodic basis.

7. The device of claim 1, wherein the at least one test comprises a loading operation to determine a load time for an application on the device.

8. The device of claim 1, wherein the computer executable instructions further cause the processor to:
request and receive the new or current build file for the new device type separately from the automatic request to obtain the current build file for at least one existing device type.

9. The device of claim 1, wherein the at least one test comprises one or more of an end-user performance test, a network performance test, or a server performance test.

10. The device of claim 9, wherein the at least one test is executed for a plurality of environments, the plurality of environments comprising one or more of a device environment, a network environment, or a server environment.

11. The device of claim 2, wherein the computer executable instructions further cause the processor to run parallel tests or iterations of a test on multiple devices, multiple device types, or multiple environments.

12. The device of claim 2, wherein the computer executable instructions further cause the processor to:
log testing data for a plurality of tests; and
compare the plurality of tests for at least one performance metric using logged data.

13. The device of claim 1, wherein a plurality of tests are performed to obtain data under different conditions.

14. A method of automated application testing, the method executed by a device having a communications module and comprising:

integrating an application testing environment with an application development environment by directly connecting a testing environment interface coupled to a testing execution module to a development environment interface coupled to a repository used by the application development environment to store build files generated in the application development environment, for each of at least one device type;

determining that a new device type is to be added to the application testing environment;

automatically adding the new device type to an application testing framework in the application testing environment;

automatically requesting by the testing environment via the direct connection from the repository, a current build file for each of the at least one device type, including a new or current build file for the new device type;

automatically receiving via the direct connection, from the repository, the current or a new build file for each device type;

deploying each new or current build file on a respective device type;

initiating at least one test on each device type based on a simulation of the device operating according to the new or current build file and obtain test result data; and automatically feeding back the test result data via the direct connection to the application development environment.

15. The method of claim 14, wherein a plurality of current build files are requested and received, for a plurality of respective device types.

16. The method of claim 14, further comprising:
determining a testing time;
initiating the request at the testing time;
obtaining test results for the at least one test; and
sending data associated with the at least one test to the development environment.

17. The method of claim 14, further comprising:
requesting and receiving the new or current build file for the new device type separately from the automatic request to obtain the current build file for at least one existing device type.

18. The method of claim 14, wherein the at least one test comprises one or more of an end-user performance test, a network performance test, or a server performance test.

19. The method of claim 15, further comprising running parallel tests or iterations of a test on multiple devices, multiple device types, or multiple environments.

20. A non-transitory computer readable medium for automated application testing, the computer readable medium comprising computer executable instructions for:

integrating an application testing environment with an application development environment by directly connecting a testing environment interface coupled to a testing execution module to a development environment interface coupled to a repository used by the application development environment to store build files generated in the application development environment, for each of at least one device type;

determining that a new device type is to be added to the application testing environment;

automatically adding the new device type to an application testing framework in the application testing environment;

automatically requesting by the testing environment via the direct connection from the repository, a current build file for each of the at least one device type, including a new or current build file for the new device type;

automatically receiving via the direct connection, from the repository, the current or a new build file for each device type;

deploying each new or current build file on a respective device type;

initiating at least one test on each device type based on a simulation of the device operating according to the new or current build file and obtain test result data; and automatically feeding back the test result data via the direct connection to the application development environment.

\* \* \* \* \*